United States Patent [19]

Jonkey et al.

[11] 3,886,491

[45] May 27, 1975

[54] EXPANDABLE SONAR ARRAY

[75] Inventors: Loren M. Jonkey, Burbank; Eugene Markus, North Hollywood, both of Calif.

[73] Assignee: The Bendix Corporation, North Hollywood, Calif.

[22] Filed: Sept. 12, 1973

[21] Appl. No.: 396,977

[52] U.S. Cl. .................. 340/9; 310/9.1; 340/85
[51] Int. Cl. ......................................... H04b 13/00
[58] Field of Search .............. 340/7, 8, 8 S, 9, 10, 12, 340/13, 17; 114/235 B; 343/709, 343/881, 915; 310/9.1

[56] References Cited
UNITED STATES PATENTS

| | | | |
|---|---|---|---|
| 3,141,148 | 7/1964 | Hueter | 340/9 |
| 3,375,488 | 3/1968 | Bridges | 340/8 R |
| 3,539,979 | 11/1970 | Crall | 340/8 S |
| 3,566,346 | 2/1971 | Scopatz | 340/8 S |

*Primary Examiner*—Benjamin A. Borchelt
*Assistant Examiner*—H. J. Tudor
*Attorney, Agent, or Firm*—Robert C. Smith; William F. Thornton

[57] ABSTRACT

A transducer array for a dip sonar system is disclosed in which a central body is attached to a suspending cable and a substantial number of vertically oriented hydrophone staves are attached to the outside of the body by means of parallelogram linkages which are buoyant and which are caused to swing outwardly when the array is deployed at the desired depth, thus placing the hydrophones in a cylindrical array at a substantial distance outwardly from the body. Also deployed are a number of projector transducers which are attached to a weighted base member which drops from the lower end of the body. Latching means are employed to hold the parallelogram linkages against the body when the array is being stored, lowered into the water, or recovered. Because it is desirable that the staves be of greater length than the body, one section of each stave is attached through gearing means to the remainder of the stave such that it can fold 180 degrees against the body.

7 Claims, 8 Drawing Figures

EXPANDABLE SONAR ARRAY

BACKGROUND OF INVENTION

Dipping sonar systems have been in existence for well over a decade. Recent advancements in the quieting of submarines and the range of submarine weapons require sonar systems of much greater capability than those now in use. The most practical way of meeting these new requirements is to deploy a long range sonar on a highly mobile platform to substantially increase the area search rate.

Longer sonar ranges can be achieved by using lower operating frequencies with an attendant increase in the size of acoustic projectors and receiving arrays. The large array requirements, however, are inconsistent with the desires for mobility, since deployment times (ascent and descent) become prohibitively long and mobile dipping platforms (such as helicopters) have severe weight and size limitations.

SUMMARY OF THE INVENTION

The above requirements can be satisfied by employing a dipping sensor package which expands during operation and retracts into a size suitable for the suspending platform during ascent and stowage. Considering the acoustic requirements, a receiving array of cylindrical shape consisting of staves containing the individual hydrophone elements was desired. The diameter and length of the cylindrical array must reduce to be compatible with the platform constraints. Also, the array should retract to increase descent and ascent speeds and aid body hydrodynamic stability. The deployment system described herein expands radially and axially using buoyant forces for expansion and hydrodynamic drag forces for retraction.

Applicants have designed a hydrophone array structure in which each stave carries a plurality of axially aligned hydrophones and each stave is connected to the generally cylindrical transducer body through a parallelogram linkage which, in addition to carrying the electrical signals from the hydrophones into the amplifiers and other electrical circuitry within the cylindrical housing itself, is positively buoyant to aid in the deployment of the staves. Thus, the staves are held, through a latching mechanism, retracted against the side of the cylindrical housing until reaching the desired operating depth. At this point, the transmitting projectors are deployed axially downwardly from within the cylindrical housing such that they extend below the housing and the parallelogram support linkages for the hydrophone staves are released and move outwardly through their inherent buoyancy. One section of each such stave is folded against the cylindrical housing or body member such that as the main stave structure is moved outwardly essentially parallel to the axis of the body member and the parallelogram linkage is rotating 90°, a gear drive structure also rotates this portion of the stave downwardly an additional 90° such that it is deployed 180° from its as-folded position, thereby further extending the length of the stave. A plurality of spring-loaded members serve to hold the staves in their deployed position during operation, but do not impose sufficient resistance to inhibit the refolding of the parallelogram linkages and staves against the side of the cylindrical body when an upward force is supplied through the connecting calbe to reel the transducer back into the platform.

DESCRIPTION OF THE DRAWINGS

FIG. 6b is a section taken along lines B—B of FIG. 6a.

DESCRIPTION OF THE PREFERRED EMBODIMENT

Figure 1:
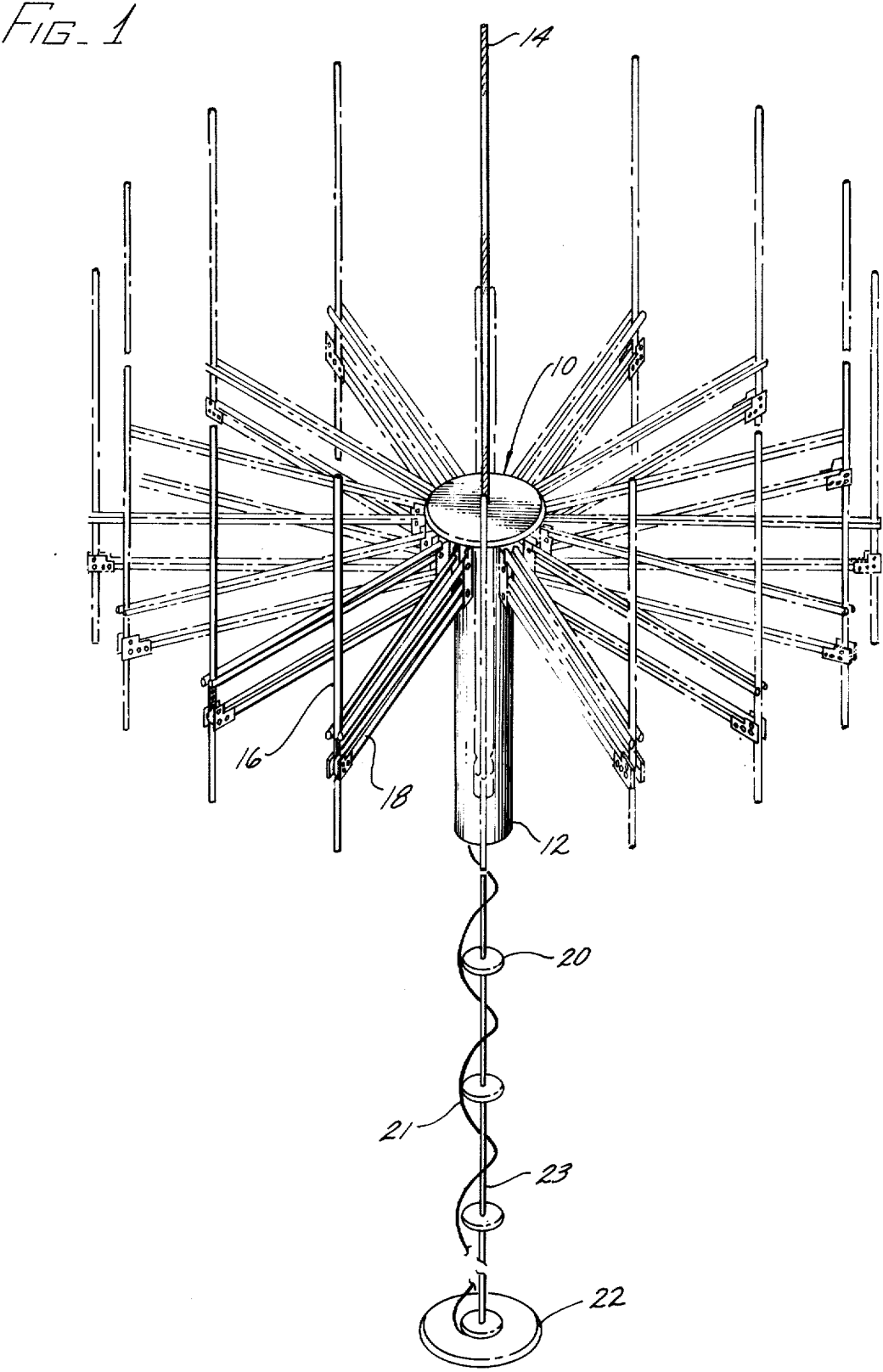
FIG. 1 is a perspective view, partly in phantom, of our transducer as deployed.

Referring now to FIG. 1, an array structure is shown generally at numeral 10 and includes a cylindrical housing body 12 suspended by means of a cable 14. Fastened to the outside surface of the cylindrical body 12 are a substantial number (in this case 16) of transducer staves 16 which are attached to the body 12 through parallelogram linkages 18. Carried within the body 12 and deployed essentially concurrently with the staves 16 are a plurality of projector transducers 20 which are interconnected electrically through a cable 21 and also connected together physically and pulled out in an array along a tethering cable or cord 23 by means of a weighted transducer base member 22. In addition to providing sufficient weight to assure the deployment of a projector string, base 22 may also contain structures such as a reeling mechanism for coiling the cord or cable 23 along which the projector members 20 are deployed.

Figure 2:
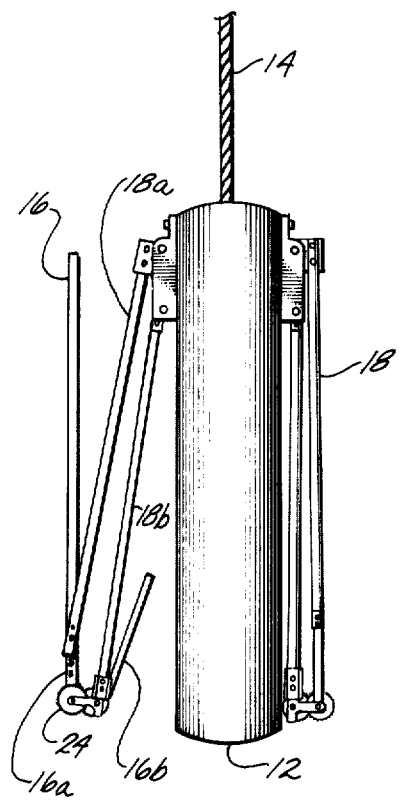
FIG. 2 is a plan view of the cylindrical central body of our array structure with two parallelogram linkages shown, one of which is partially extended.
Figure 3:
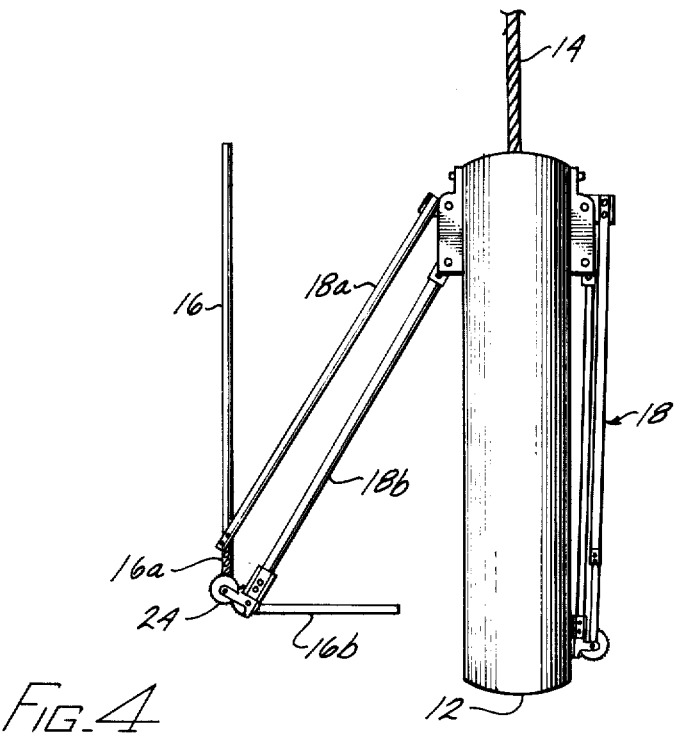
FIG. 3 is a view similar to FIG. 2 but with one parallelogram linkage extended somewhat further than shown in FIG. 2.
Figure 4:
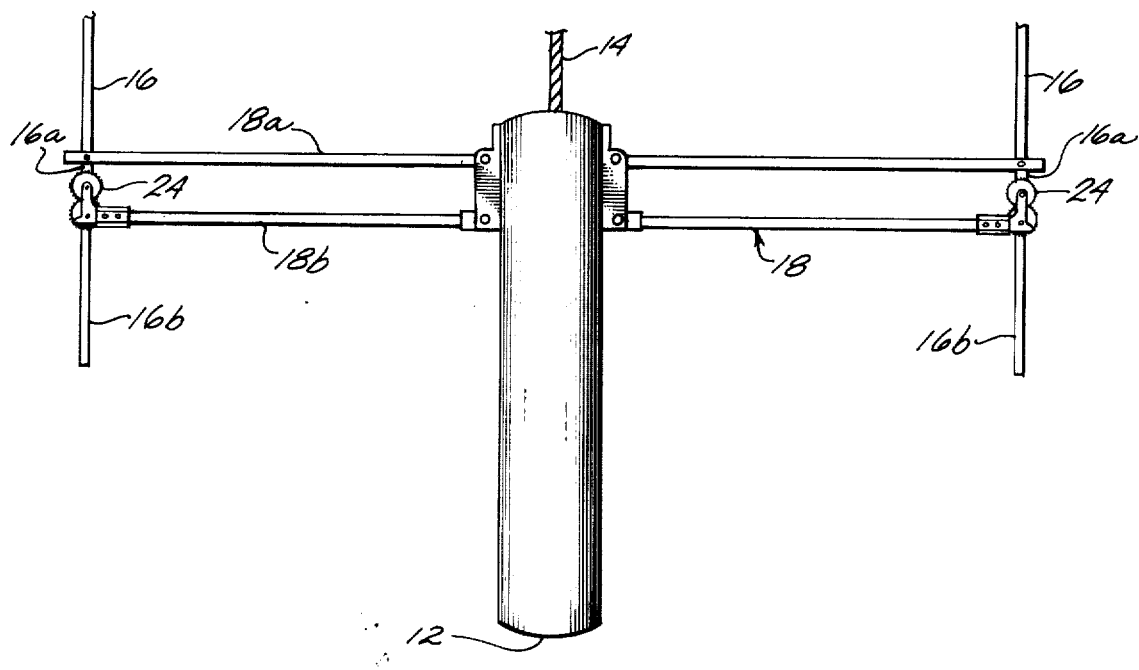
FIG. 4 is a plan view of the array structure with the two sets of parallelogram linkages shown in FIGS. 2 and 3, each fully extended.

In FIG. 2 the cylindrical housing body 12 is shown with only two parallelogram linkage structures 18 illustrated to aid the reader in understanding the manner in which the staves are deployed. As retracted, the linkage structure is shown at the right side of FIG. 2. The structure shown on the left side of FIG. 2 depicts a linkage which is just beginning to be extended. The parallelogram linkage arms 18a and 18b are swung outwardly a small distance around their respective pivots, and the stave 16, being an extension of the short outboard link 16a, moves outward parallel to the body axis. At the same time, this rotates the gears 24, causing the lower section 16b of the stave structure to begin rotating clockwise. In FIG. 3, the linkage structure 18 is shown extended to a somewhat greater degree than in FIG. 2. At this point the stave 16 is shown in a vertical position, parallel to the sides of body 12 which attitude it retains as the linkage is extended further. At the same time, the gears 24 are rotated further, causing stave element 16b to rotate to a position approximately 90° displaced from its retracted position. Further rotation of the stave and parallelogram linkage structure results in the fully deployed position as illustrated in FIG. 4. In this position the stave element 16b has now rotated a full 180° (although a 90° rotation through the gear sectors) and now extends downwardly in direct alignment with the principal stave member 16, resulting in a stave structure substantially longer than the length of body 12.

Figure 5A:
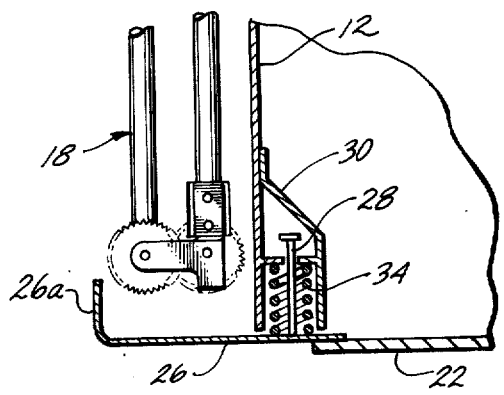
FIG. 5a is a partial sectional view of the lower portion of the cylindrical central body member showing a latch mechanism for retaining the parallelogram linkages in their retracted position.
Figure 5B:
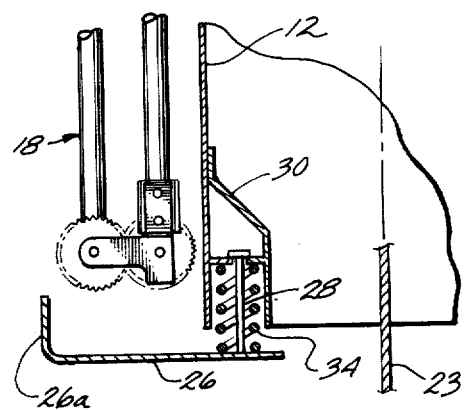
FIG. 5b shows the structure of FIG. 5a with the latch mechanism released.

It will be recognized that some means is required to cause the linkages 18 to remain folded against body 12 until the array reaches the desired depth. While a number of latch mechanisms might be used, applicants have shown a suitable latch mechanism in FIGS. 5a and 5b. Referring now to FIG. 5a, which is a partial sectional view of the lower end of body 12, a locking plate 26 is shown fastened to the bottom of body 12 through the action of a series of pins 28 fastened thereto which are captured in housings 30 fastened to the bottom of body 12. Forming part of housing 30 is a spring retainer structure 32 against which is applied the force of a spring 34. A portion of the weight structure 22 is shown pulled against the bottom of plate 26, thereby compressing spring 34 and causing the lip 26a to assume a position which prevents the deployment of the linkage 18. In FIG. 5b it will be observed that the weight 22 has dropped away from the locking plate 26, thereby causing plate 26 to move downwardly under the influence of spring 34. This moves lip 26a away from linkage 18, leaving the linkage free to swing outwardly.

Figure 6B:
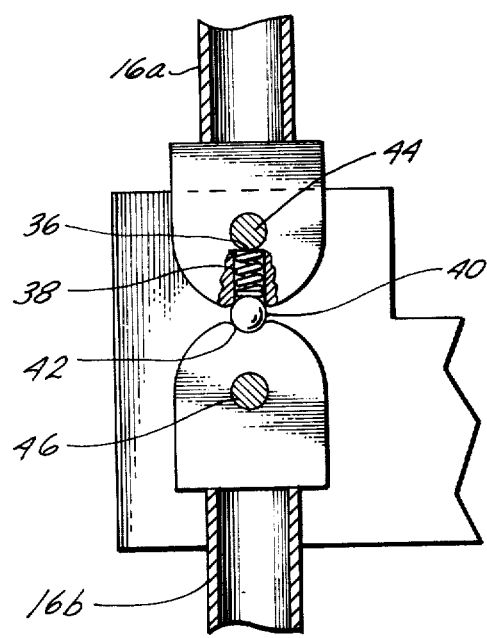
Figure 6A:
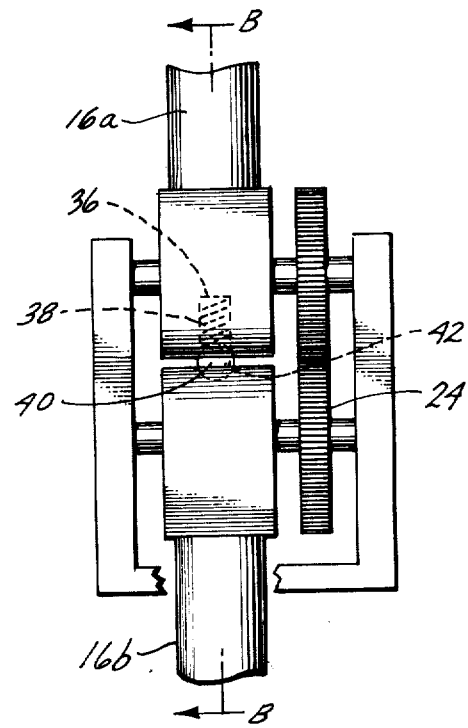
FIG. 6a is a plan view, partially in section, showing the ball detent structure used to hold the parallelogram linkage in deployed position.

When the staves are deployed at the end of the extended parallelogram linkages 18, they are held in deployed position largely through the inherent buoyancy of the individual members. These members are typically made of sealed hollow tubing of relatively light weight metal and therefore have substantial positive buoyancy. In order to provide some resistance to any tendency of the linkages to tend to collapse through wave action, contact with marine life, etc., the structure shown in FIGS. 6a and 6b is employed as a form of "soft" latching structure. FIG. 6a is a plan view of the staves 16 looking from the outside end wherein are seen stave sections 16a and 16b which are rotated into their desired relative positions through the action of gears 24. Shown in partial section at the ends of each of members 16a and 16b is a ball detent structure including a cylindrical opening 36 containing a spring 38 urging a confined ball member 40 outwardly into a recess 42 positioned in the adjoining end of member 16b. FIG. 6b is a sectional view of the device shown in FIG. 6a taken along line B—B of FIG. 6a. In this view, it will be seen that the ends of members 16a and 16b are rounded to permit their relative movement as described. Movement, of course, is around shaft centers 44 and 46 which are connected to the gears 24. Again, the spring 38 is retained within a cylindrical opening 36 and operates to press the ball member 40 into the detent 42 formed on the end of member 16b. This arrangement provides a "soft" latching action which tends to hold members 16a and 16b in axial alignment and thereby tends to inhibit the collapsing of the parallelogram structure 18. When it is desired to retract the structure, however, through pulling on cable 14, the resistance imposed by this latch is insufficient to prevent this closing.

All of the staves and parallelogram linkage structures are maintained in retracted position for descent, ascent and stowage in the vehicle serving as the platform. When it is desired to operate the system, the array structure with staves, retracted, is lowered into the water at the end of cable 14. When the desired depth is reached or, preferably, just before reaching this depth, the base member 22 is released and it continues to fall, extending the array of projectors 20 and moving the locking plate 26 away. Due to their inherent buoyancy, the parallelogram members 18 and staves 16 then extend outwardly into the position as shown in FIG. 1. Each of the staves 16 may have a plurality (typically four or five) of hydrophones positioned thereon. The cable 14, in addition to providing the strength member for lowering and raising the transducer 10, also contains the conductor or conductors required for initiation of the projected signals and for carrying the received signals back to a display device in the platform vehicle. When it is desired to transfer to a new location, the operator causes the projectors to be reeled up into the body 12 while at the same time or shortly thereafter beginning the ascent of the array structure 10. As the force is applied to cable 14 to pull the body member 12 upwardly, the parallelogram linkages 18 and staves 16 will fold back into their retracted position and the base plate member 22 will close against the bottom of body 12, thereby latching the linkages 18 against the side of member 12 by means of lip 26a on the locking plate 26. The transducer 10 is then in fully retracted position and can be raised into the platform vehicle as desired.

While a specific embodiment has been described herein, modifications may be made to suit the requirements of any particular application. Thus, while the structure for rotating stave section 16b into the desired operating position is shown as a pair of mating gears, this function could also be supplied by a pulley and cable structure. While the transmitting array would preferably be deployed below member 12 in a manner similar to that disclosed, there are many ways of actually supporting and suspending the individual projector elements. And while the structure shown in FIGS. 6a and 6b is useful for retaining the staves in their deployed positions, other soft latching mechanisms will work as well.

We claim:

1. An underwater array structure constructed to be successively lowered into and raised out of a body of water at the end of a suspension and signal-conducting cable, said structure comprising a body member attached to said cable, a plurality of essentially identical hydrophone support members connected to the exterior of said body member through connection means, said connection means including a parallelogram linkage arrangement and gear drive means whereby after said hydrophone support members are lowered into the water they are extendable radially a substantial distance from said body, an upper part of each of said hydrophone support members is maintained essentially parallel to its support on said body member and a lower part thereof is connected through said gear drive means to be rotated 180° from an upwardly extending position to a downwardly extending position as said linkage is extended, a plurality of hydrophones carried on said support members, and a plurality of projector elements carried in said body and means deploying said projector elements below said body.

2. An underwater array structure as set forth in claim 1 wherein said support members are buoyant and extend upwardly and outwardly as said means deploying said projector elements is actuated, and fold against said body member as said array is pulled upwardly out of the water.

3. An underwater array structure as set forth in claim 1 wherein latch means are fastened to said support members holding said support members against said body member until released and which secure and hold said support members against said body member upon ascent out of the water.

4. An underwater array structure as set forth in claim 3 wherein said latch means is actuated to release said support members when said projector elements are deployed and to secure said support members when said projector elements are secured in said body.

5. An underwater array structure as set forth in claim 1 wherein said housing includes a releasable base plate member and a latch plate attached thereto and said projector elements are deployed following release of said base plate from said housing.

6. In a vehicle-borne sonar system wherein a transducer array is reeled into and out of a body of water at the end of a cable, said array comprising:

a housing fastened to said cable containing electronic equipment, a plurality of deployable projector elements, means deploying said projector elements, and means connecting said projector elements together and to said electronic equipment;

a plurality of hydrophone staves attached to said housing, each stave attachment including a parallelogram linkage wherein one link thereof includes part of an associated stave, said linkage when retracted positioning itself and its associated stave against said housing and when extended supporting said stave a substantial distance outwardly from said housing, a length of each said stave being folded against said housing when said linkages are retracted, and means for rotating said length into axial alignment with the remainder of said stave when said staves are deployed such that each said stave is longer than said housing, said linkages and staves being positively buoyant in water; and means securing said linkages against said housing until released at a desired depth of said transducer array.

7. An underwater transducer array as set forth in claim 6 wherein said securing means includes latch means responsive to deployment of said projector elements for releasing said linkages.

* * * * *